US008543597B1

(12) United States Patent
Rau et al.

(10) Patent No.: US 8,543,597 B1
(45) Date of Patent: Sep. 24, 2013

(54) GENERIC APPLICATION PERSISTENCE DATABASE

(75) Inventors: Stefan Rau, Dielheim (DE); Uwe Bloching, Nuβloch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/437,671

(22) Filed: Apr. 2, 2012

(51) Int. Cl.
*G06F 17/30* (2006.01)

(52) U.S. Cl.
USPC .......................................................... 707/779

(58) Field of Classification Search
USPC ....................... 707/5, 102, 810, 779; 709/219
See application file for complete search history.

(56) References Cited

U.S. PATENT DOCUMENTS

| 2003/0163479 | A1* | 8/2003 | Mathews et al. | 707/102 |
| 2008/0162457 | A1* | 7/2008 | Dehn et al. | 707/5 |
| 2010/0250625 | A1* | 9/2010 | Olenick et al. | 707/810 |

* cited by examiner

*Primary Examiner* — Etienne Leroux
(74) *Attorney, Agent, or Firm* — Buckley, Maschoff & Talwalkar LLC (57) ABSTRACT

A method includes receiving a request from a client to perform an application operation, transmitting a generic application persistency statement defined in an application template corresponding to the application, where the template belongs to a set of predefined application templates. Searching a logical database for a first location having entries corresponding to a technical key and an operation identifier, determining a second technical key based on content stored at the first location, searching the logical database for a second location having entries corresponding to the second technical key and a dataset key, determining a third technical key based on content stored at the second location, and accessing locations of the logical database based on the third technical key, wherein the contents of the logical database locations correspond to content of a physical database. A system to implement the method and a computer readable medium are disclosed.

17 Claims, 12 Drawing Sheets

FIG. 1

PURCHASE ORDER HEADER (POH) 200

| ORDER NUMBER 210 | SUPPLIER NAME 220 | CREATOR 230 | STATUS 240 |
|---|---|---|---|
| 1234 | MÜLLER | MAYER | ORDERED |
| 1235 | COMPUTER SCHULZE | KUNZE | DELIVERED |

PURCHASE ORDER ITEM (POI) 250

| ORDER NUMBER 255 | ITEM NUMBER 260 | PRODUCT 265 | QUANTITY 270 | DIMENSION 275 | DUE DATE 280 | ITEM AMOUNT 290 | CURRENCY 295 |
|---|---|---|---|---|---|---|---|
| 1234 | 1 | PENCIL | 10 | PC. | | 10 | € |
| 1234 | 2 | PAPER | 1 | BOX | | 2 | € |
| 1235 | 1 | SOUNDCARD | 1 | | 2001/02/20 | 100 | € |
| 1235 | 2 | NOTEBOOK | 5 | | 2001/02/20 | 500 | € |
| 1235 | 3 | SERVER | 1 | | 2001/02/20 | 2000 | € |

FIG. 2

APPLICATION 300

| FIRST TECHNICAL KEY 305 | APPLICATION IDENTIFIER 310 | ORGANIZATIONAL IDENTIFIER 315 |
|---|---|---|
| 1 | PROCUREMENT APPLICATION | ITELO |
| 2 | SALES APPLICATION | SAP WALLDORF |
| 3 | PROCUREMENT APPLICATION | SAP HEIDELBERG |

TABLE 340

| SECOND TECHNICAL KEY 345 | FIRST PARENT TECHNICAL KEY 350 | APPLICATION IDENTIFIER 355 |
|---|---|---|
| 1 | 1 | POH |
| 2 | 1 | POI |

DATASET 370

| THIRD TECHNICAL KEY 375 | SECOND PARENT TECHNICAL KEY 380 | DATASET KEY 385 |
|---|---|---|
| 1 | 1 | 1234 |
| 2 | 2 | 1234-1 |
| 3 | 2 | 1234-2 |
| 4 | 1 | 1235 |
| 5 | 2 | 1235-1 |
| 6 | 2 | 1235-2 |
| 7 | 2 | 1235-3 |

FIG. 3

| | | PARAMETER | 400 |
|---|---|---|---|
| FOURTH TECHNICAL KEY 410 | THIRD PARENT TECHNICAL KEY 415 | PARAMETER NAME 420 | VALUE 425 |
| 1 | 1 | ORDER NUMBER | 1234 |
| 2 | 1 | SUPPLIER NAME | MÜLLER |
| 3 | 1 | CREATOR | MAYER |
| 4 | 1 | STATUS | ORDERED |
| 5 | 2 | ORDER NUMBER | 1234 |
| ... | ... | ... | ... |
| 19 | 4 | ORDER NUMBER | 1235 |
| 20 | 4 | SUPPLIER NAME | COMPUTER SCHULZE |
| 21 | 4 | CREATOR | KUNZE |
| 22 | 4 | STATUS | DELIVERED |
| 23 | 5 | ORDER NUMBER | 1235 |
| 24 | 5 | ITEM NUMBER | 1 |
| 25 | 5 | PRODUCT | SOUNDCARD |
| 26 | 5 | QUANTITY | 1 |
| 27 | 5 | DUE DATE | 2001/02/20 |
| 28 | 5 | ITEM AMOUNT | 100 |
| 29 | 5 | CURRENCY | € |
| 30 | 6 | ORDER NUMBER | 1235 |
| 31 | 6 | ITEM NUMBER | 2 |
| 32 | 6 | PRODUCT | NOTEBOOK |
| 33 | 6 | QUANTITY | 5 |
| 34 | 6 | DUE DATE | 2001/02/20 |
| 35 | 6 | ITEM AMOUNT | 500 |
| 36 | 6 | CURRENCY | € |
| ... | ... | ... | ... |

GENERIC APPLICATION PERSISTENCE DATABASE

BACKGROUND

Data driven applications include tools developed to access information within a database using a predefined data model design specific to the particular application (and perhaps also specific to customer requirement(s)). As these applications are revised, upgraded, and/or superseded the data model design for the application can change to incorporate these revisions, upgrades, and changes. When changes to the application software introduce deviations in the data model design, the conventional database can undergo an update of its database structures to remain compatible (e.g., accessible, readable, writeable, etc.) with the application. Database upgrade and/or modification can consume a great amount of time and system resources proportional to the magnitude of the data set(s) within the database. Such upgrade/modification can run the risk of data loss. This loss can be permanent as roll back of the database structure can often not be possible.

DETAILED DESCRIPTION

An embodying system and/or method can persist application data in a generic way. The persistency implementation can be extensible (industry specific, customer specific, user specific, etc.) without changing the physical database layout. The embodying systems and methods enable upgrades to application software without the need to update the database on the running system. Accordingly, different release versions of applications can operate on the same logical database, at the same time, and under the same system. The embodying system(s) and/or method(s) can create logical different data views independent of the physical data structure. The data itself can have a fixed scheme that may be independent of any application seeking access to the data.

The embodying system(s) and/or method(s) can facilitate access by upgraded and/or revised applications to the data without the need to shut down the database for restructuring, with no risk to data access due to application release upgrades, and when multiple organizations (e.g., enterprises, companies, customers, clients, end users, etc.) operate as several logical tenants there can be an enormous reduction of total-cost-of-ownership (TCO) for the database.

Conventionally, for each application there can be its own set of database tables to store data. The possibility of extending the database model and its implementation can be limited. Older applications might be able to have extensions only on a system level. Newer applications might be written to have extensibility on a client base. The extensibility of database tables for a custom specific adoption/adaptation) can be difficult in a hosted environment. The extensibility can be based on concepts that extend the data structure in a dictionary itself by several columns. Application adoption/adaptation can follow the data base adoption/adaptation by applying application logic for the modified columns. However, these approaches might not make it possible to implement incompatible changes like modifying the type of data and/or deleting any columns of data base tables.

To accomplish these approaches each customer may need a separate client in a hosted system that contains several customers. Further, customer specific application code might have to be compatible to the original data structure even when there are fields that are not used anymore by the customer, or if there are fields used by a different customer. Additional fields defined for a specific customer might need to be visible to all other customers on the system. Update of software can include update to the database structure(s) itself. These updates can be very time consuming (resulting in no access to the data until completed), and can be a risky step in the update process. A roll back to the prior state may not possible in the most cases.

The architecture of embodying system(s) and/or method(s) can include a generic application persistency (GAP) database implementation where the definition of its data structures may be independent of the real data base implementation. A writing application can have a separate definition of the data structure supplied as metadata templates. Application code can be specific for every application like well-known implementations of business applications. There can be the capability for personalization of the application to adopt/adapt to a customer specific configuration.

An embodying data model of the generic application persistency database can have a data model structure independent of any application. This independence can permit the data stored according to the physical database's predefined data model to be extensible. For example, fields can be added if required and that field can be customer specific, industry specific, user specific, data set specific, or a combination thereof. With this independence and extensibility the fields of the GAP database can be accessed by an application without restriction. The GAP database implementation can support different customers working on one and the same system client. This can reduce maintenance costs enormously, eliminate the need for database model structure updates, and minimize the risk of an update. Further, an update to the application can be done on a running system.

Figure 1:
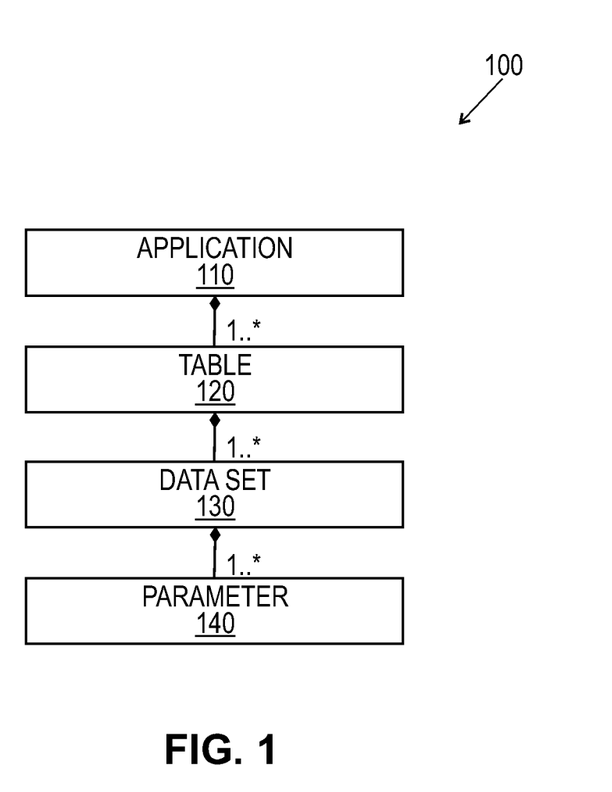
FIG. 1 depicts a database design in accordance with an embodiment.

FIG. 1 depicts an embodying database design 100 having four containers (i.e., tables). The cardinality relationships of the containers are indicated in FIG. 1. An embodying system can use four containers for all applications. In accordance with an embodiment, application specific database modeling can be eliminated. Application container 110 can contain application relevant data (e.g., technical key(s), application name, etc.). For multi tenancy applications, application container 110 can also include an organization or user group (e.g., enterprises, companies, customers, clients, end users, etc.) identifier.

Table container 120 can include one or more descriptions of all logical tables of the application. Table container 120 can contain a reference to an associated application (e.g., an application that accesses the data) and the name of a table (e.g., technical key(s), parent container technical key (e.g., technical key of application container 110), table name, etc.) Dataset container 130 can contain a list of the rows of a table and references (e.g., technical key(s), parent technical key (e.g., technical key of table container 120, and dataset key(s)—which may be a combined key). Parameter container 140 can generically contain all data of an application. Parameter table 140 can include the dataset of where application data belongs, and the data itself as a generic type. The type of data can be defined in the metadata definition described below. Parameter table 140 can include references to this information (e.g., technical key(s), parent container technical key (e.g., the technical key of dataset container 130), parameter name(s), and value(s)). In accordance with an embodiment, the containers 110, 120, 130, 140 can be combined to a single container, or more than one container, that includes a combination of the data discussed above for containers 110, 120, 130, 140.

Figure 2:
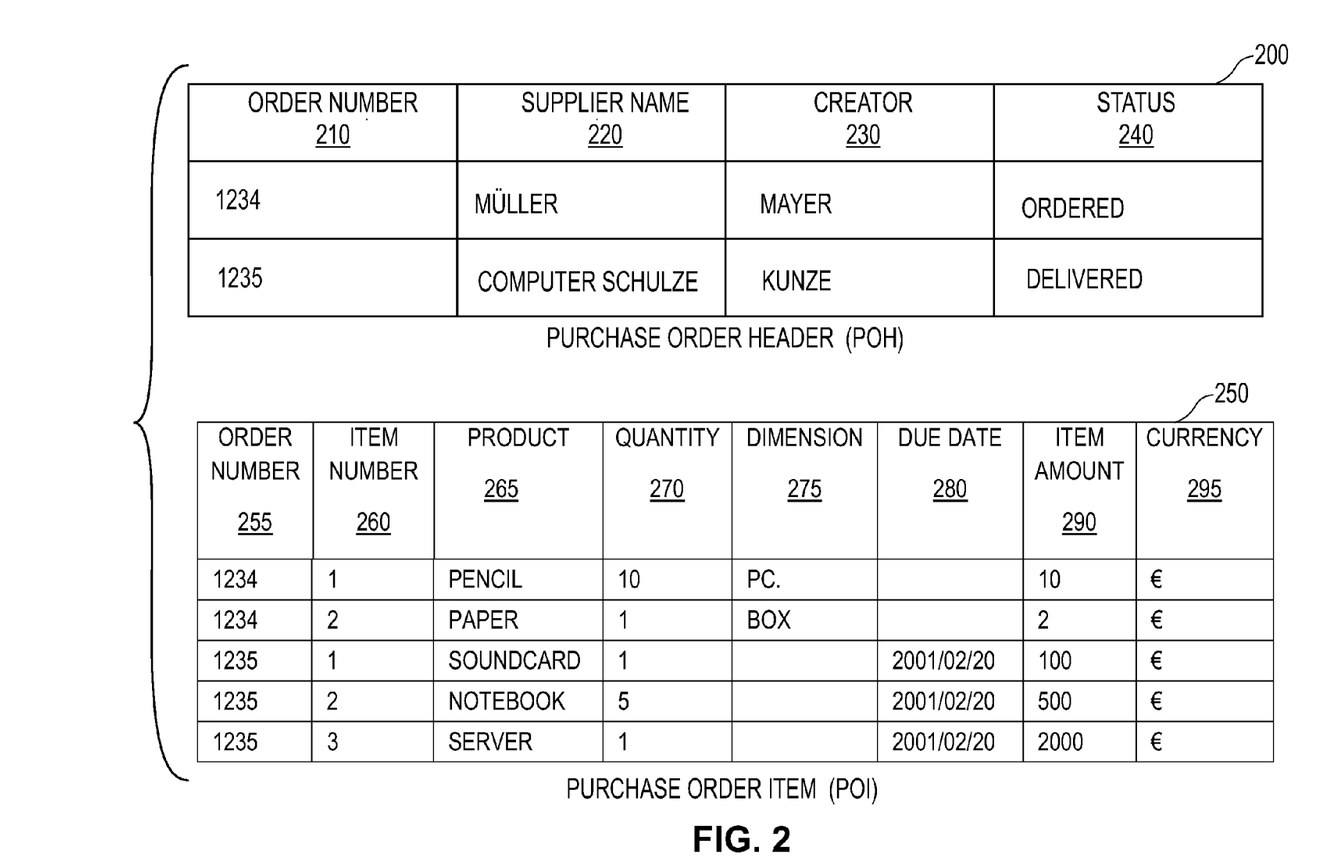
FIG. 2 depicts two physical database tables.

By way of example, an embodying GAP system and method to implement a basic procurement application is described. In its conventional implementation, the procurement application can have two physical database tables—purchase order header (POH) and purchase order item (POI). FIG. 2 depicts purchase order header (POH) table 200 and purchase order item (POI) table 250. POH table 200 includes the following definitions: order number key 210, supplier name 220, creator 230, and status 240. POI table 250 includes the following definitions: order number key (i.e., the corresponding key defined in the parent table "POH") 255, item number key 260, product 265, quantity 270, dimension 275, due date 280, item amount 290 and currency 295. Blank fields can be empty or have a default value. For purposes of this discussion, the company using this procurement application is named ITelo.

In an embodying GAP database system, POH table 200 and POI table 250 can be represented by templates. A template can describe a logical database structure according to application requirements. The data associated to the templates defined within a GAP database system can be stored in a fixed set of four physical database containers. The logical representation of data (templates) may be completely independent from the data's physical representation. Altering the structure of a logical database representation does not require the altering of a physical database table. In conventional database systems, the physical altering of a database table can be responsible for high TCO at the customer site. This cost can be attributed to the inaccessibility of the database during the altering process. Depending on the sizes of the database tables and the amount of data within the tables that undergo alteration, the conventional altering process can take a couple of hours—which might be a considerable amount of downtime for a system in a hosting environment.

Figure 3:
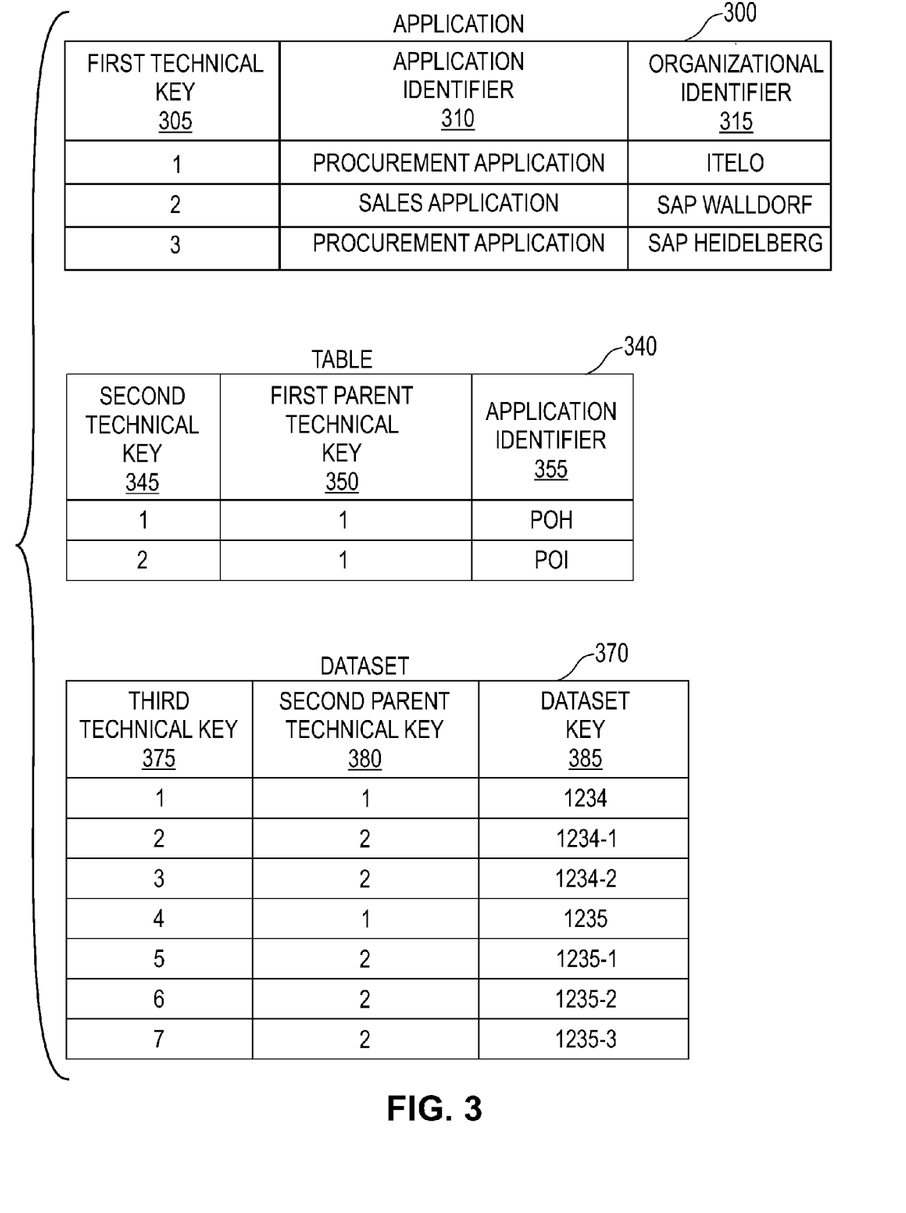
FIG. 3 depicts database container structures in accordance with an embodiment.
Figure 4:
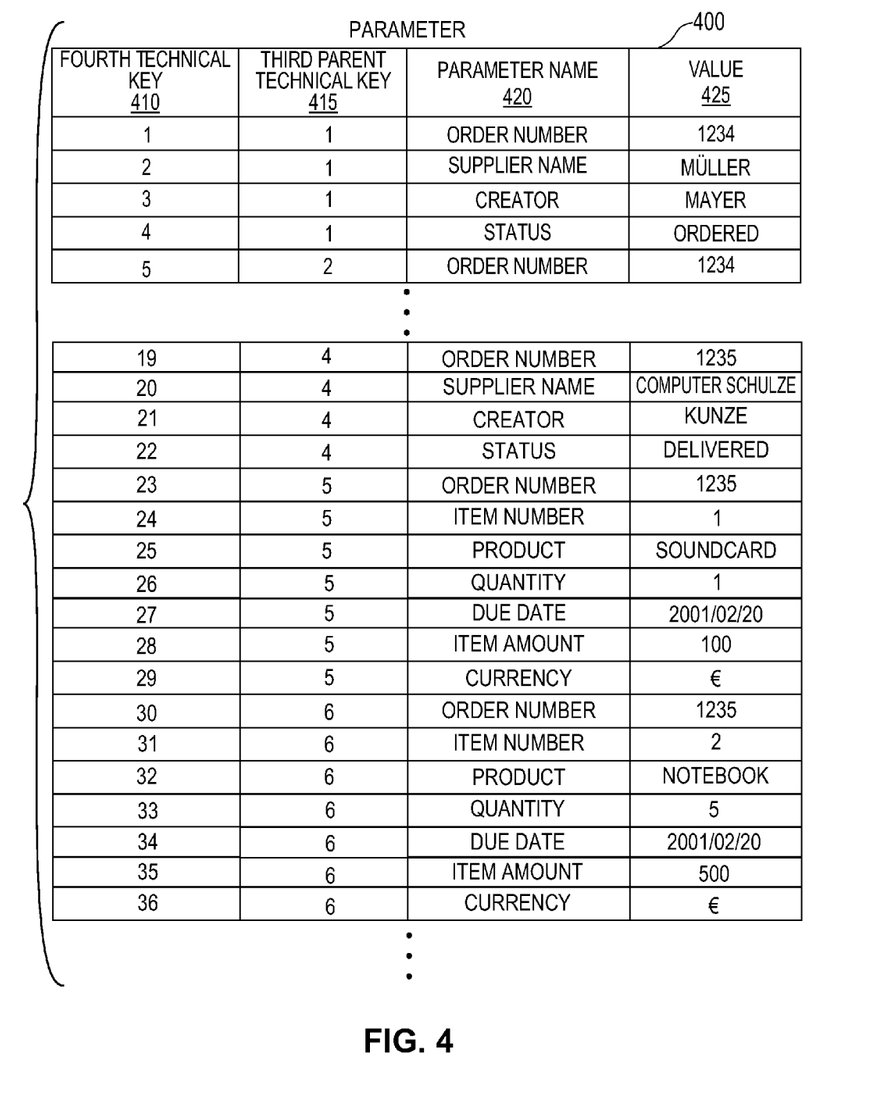
FIG. 4 depicts another database container in accordance with an embodiment.

FIG. 3 schematically depicts application container 300, table container 340, and dataset container 350 of an embodying GAP database. FIG. 4 schematically depicts parameter container 400 of the embodying GAP database Application container 300 defines first technical key 305 (e.g., 1, 2, 3), application identifier 310, which identifies 2 procurement applications (corresponding to first technical keys 1 and 3) and a sales application (corresponding to first technical key 2). Application container 300 also defines organizational identifier 315, which identifies three companies (ITelo, SAP Walldorf, and SAP Heidelberg). Technical keys can be implemented as indexing guides as an application drills down into the logical database. For presentation purposes, the technical keys are shown as readable keys but embodiments are not so limited.

Table container 340 defines second technical key 345, which defines a key for each application operation, first parent technical key 350, and logical database table identifier 355, which identifies application operations purchase order header and purchase order items. The entries for first parent technical key 350 have a correspondence with the first technical key as defined in application container 300. Dataset container 370 defines third technical key 375, second parent technical key 380, and dataset key 385, which can represent the logical database table key. The dataset key is could be used by an application to access a logical database record. The dataset key entries can be an order number (e.g., 1234) and/or an order number combined with an item number from that order (e.g., 1234-1). The entries for second parent technical key 380 have a correspondence with the second technical key defined in table container 340.

Parameter container 400 defines fourth technical key 410, third parent technical key 415, parameter name 420, and value 425. Entries in parameter container 400 have a correspondence with the entries of the physical database tables POH 200 and POI 250 (FIG. 2).

The above discussion describes the database layout for an embodying GAP database. The meaning of the data is defined within an embodying GAP system by using metadata templates. These metadata templates can be implemented with extensible properties, as was similarly described above with regard to the GAP database.

Because the data can be unstructured it may need a scheme that acts as template for an aspect or view of an application. There are different application views on the data, and these views may differ for different applications viewing the same data. For example, a view may be used by a messaging system to describe a message's parameters; a view by a user interface (UI) framework can describe a screen and its elements. Views can depend on the application version, user specific attributes (e.g., the organization to which a user is assigned, the level within that organization), industry specific implementations of an application, etc. Indeed, there may be many other dependencies for which a specific derivation could be required. For at least these reasons, embodying GAP systems and methods operate directly on the database. At user login, or when a user first starts an application session, specific templates assigned to that user can be loaded.

Figure 5:
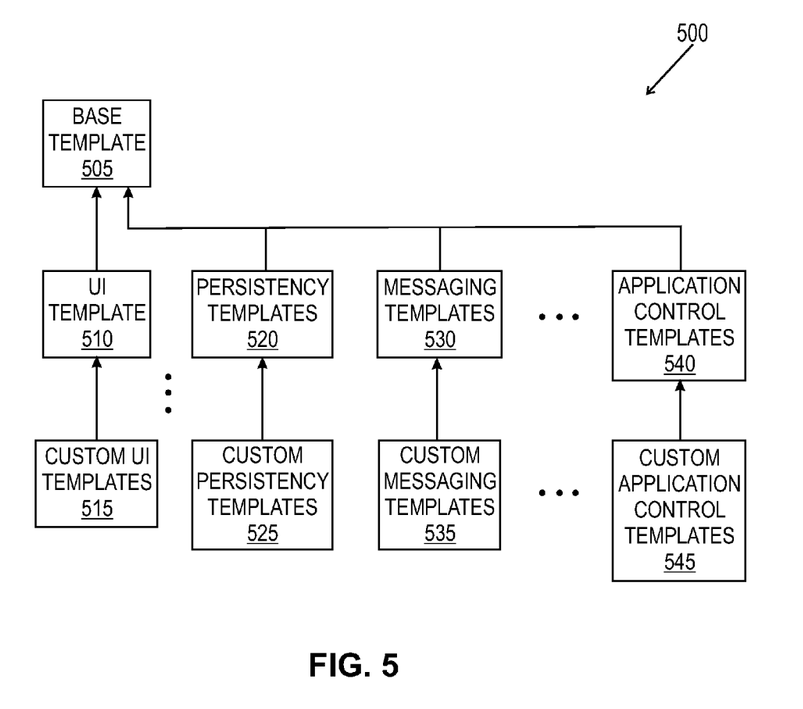
FIG. 5 depicts a template organization diagram in accordance with an embodiment.

FIG. 5 depicts template organization diagram 500 in accordance with an embodiment. The various templates can be defined from base template 505, which itself can be defined when a logical database is defined. By way of example, one or more messaging templates 530 can be derived from base template 505. Additionally, custom-messaging templates 535 can be derived from a parent-messaging template. Similar derivation structure is shown for UI, persistency, and application control templates. In accordance with some embodiments, template derivation from a single base template need not be done for each application.

For example, a procurement application accesses POH table 200 and POI table 250. A base class need not be used because these two entities differ too much from each other. Respective schemes for POH and POI may look like the following files (in a XML schema):

POH:
```
<?xml version="1.0" encoding="utf-8"?>
<xs:schema targetNamespace="http://www.sap.com/SchemaDefinitions"
    elementFormDefault="qualified"
    xmlns="http://www.sap.com/SchemaDefinitions"
    mlns:mstns="http://www.sap.com/SchemaDefinitions"
    xmlns:xs="http://www.w3.org/2001/XMLSchema"
    id="POH"
    version="1">
<xs:complexType name="POH">
<xs:sequence>
    <xs:element name="OrderNumber" type="xs:string"/>
    <xs:element name="SupplierName" type="xs:string"/>
    <xs:element name="Creator" type="userName"/>
    <xs:element name="Status" type="EnumerationStatus"/>
</xs:sequence>
</xs:complexType>
<xs:simpleType name="userName">
<xs:restriction base="xs:string">
</xs:restriction>
</xs:simpleType>
<xs:complexType name="EnumerationStatus">
<xs:choice>
    <xs:element name="New" default="1"/>
    <xs:element name="Approved"/>
    <xs:element name="Committed"/>
    <xs:element name="Declined"/>
    <xs:element name="Done"/>
</xs:choice>
</xs:complexType>
</xs:schema>
```

POI:
```
<?xml version="1.0" encoding="utf-8"?>
<xs:schema targetNamespace="http://www.sap.com/SchemaDefinitions"
    elementFormDefault="qualified"
    xmlns="http://www.sap.com/SchemaDefinitions"
    mlns:mstns="http://www.sap.com/SchemaDefinitions"
    xmlns:xs="http://www.w3.org/2001/XMLSchema"
    id="POI"
    version="1">
<xs:complexType name="POI">
<xs:sequence>
    <xs:element name="OrderNumber" type="xs:string"/>
    <xs:element name="Item number" type="xs:unsignedInt"/>
    <xs:element name="Product" type="xs:string"/>
    <xs:element name="Quantity" type="xs:unsignedInt"/>
    <xs:element name="Dimension" type="xs:string"/>
    <xs:element name="Due date" type="xs:date"/>
    <xs:element name="Item amount" type="xs:unsignedInt"/>
    <xs:element name="Currency" type="xs:string"/>
</xs:sequence>
</xs:complexType>
</xs:schema>
```

Figure 6:
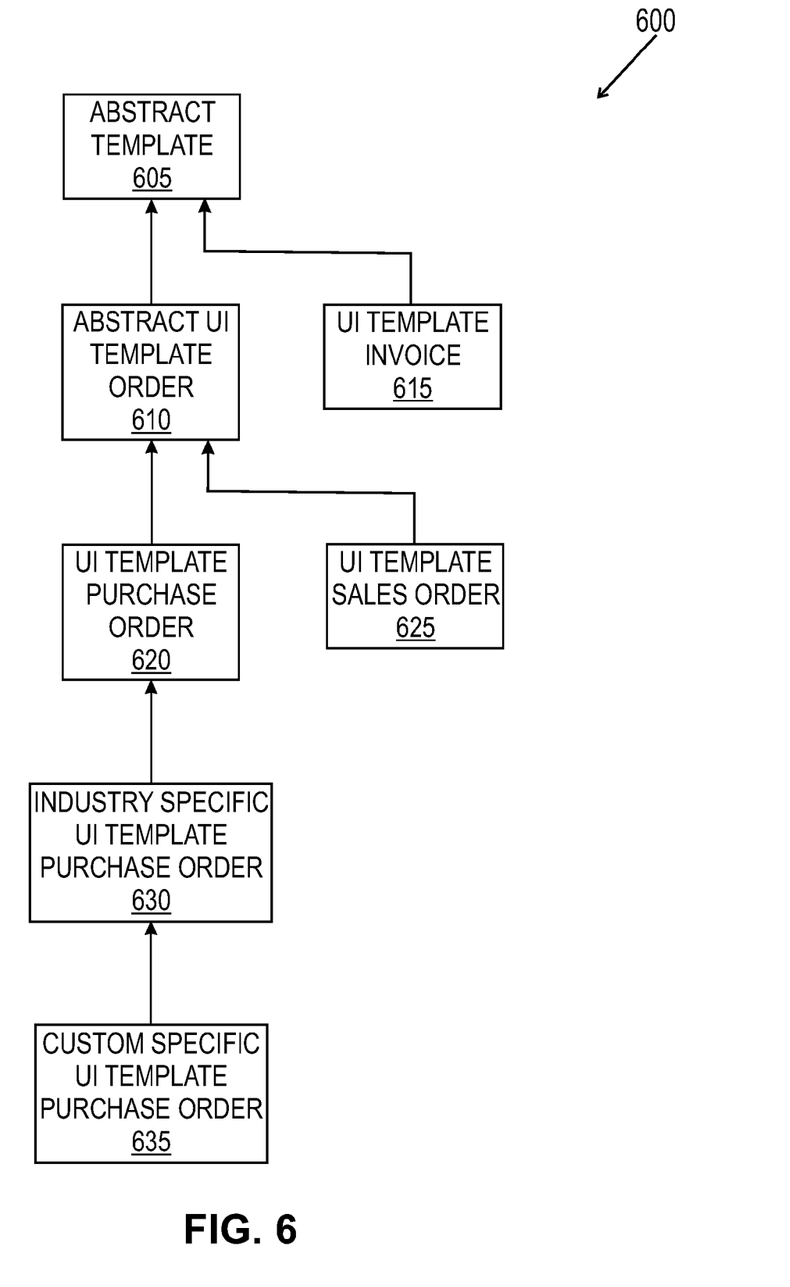
FIG. 6 depicts a template organization diagram in accordance with another embodiment.

FIG. 6 depicts template organization diagram 600 in accordance with an embodiment. Template organization diagram 600 illustrates a set of templates for a UI application specific view. It should be understood that the illustrated template organization could be readily applied to other types of applications. Template organization diagram 600 illustrates that the hierarchy of templates can be based on usage kind (e.g., UI, messaging, control, etc.) and on business context—for example, UI template purchase order 620 and UI template sales order 625 each derive from UI abstract template order 610. A user interface need not be industry or customer specific.

Figure 7:
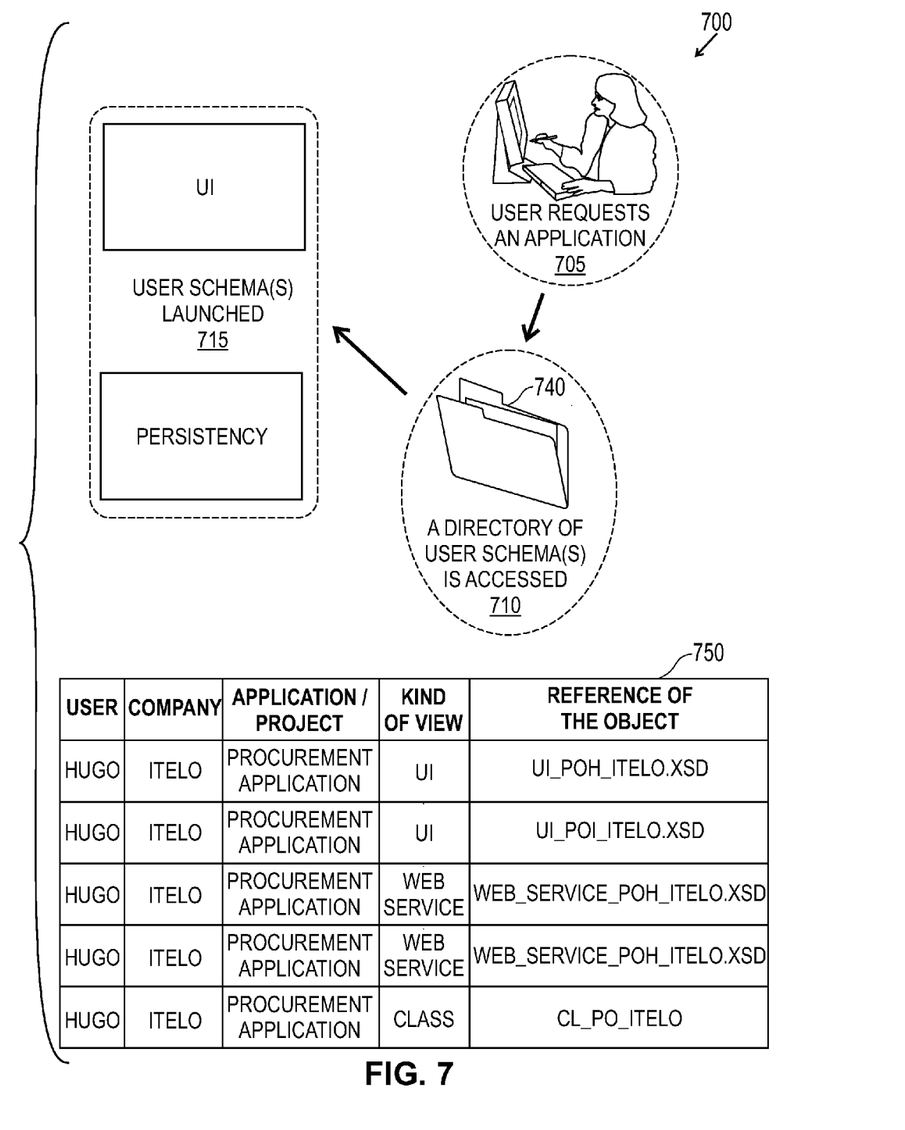
FIG. 7 depicts a process in accordance with an embodiment.

Embodiments of the GAP database can undergo personalization to implement customer (e.g., tenant) specific settings, templates, and/or code that can be loaded at runtime. Personalization can provide a user specific environment (whether personalized by the end-user, system administrator, application developer, etc.). FIG. 7 depicts personalization process 700 in accordance with an embodying GAP database method. At step 705, a user requests that an application be launched. User schemas directory 740 is accessed, step 710. The user schema(s) is launched, step 715, and loaded, for example, between the UI and the GAP database.

The user schema selection is based on the user identity (end user or organizational level—e.g., company, division, department, group, etc.) and the application being launched (e.g., messaging, UI, procurement, financial, etc.). One or more templates and code assigned to that user can be read from user schema directory 740. The template(s) and/or code can address some or all of the customized aspects of the implementation.

The user schema directory can contain different schemas for different users. A specific user is unambiguously associated with a schema of a specific application. Table 750 is a representation of the contents for a user schema. The schema may contain identifying information on the user (e.g., the name of the user or a key of the user table), organizational information (e.g., company name), application information (for example, a procurement application may have projects for purchase order, sales order, delivery dates, product catalog, etc.), view information (e.g., schema for UI, schema for messaging, the implementation itself), and a reference of the object (e.g., a filename, a class name, etc.)

Figure 8:
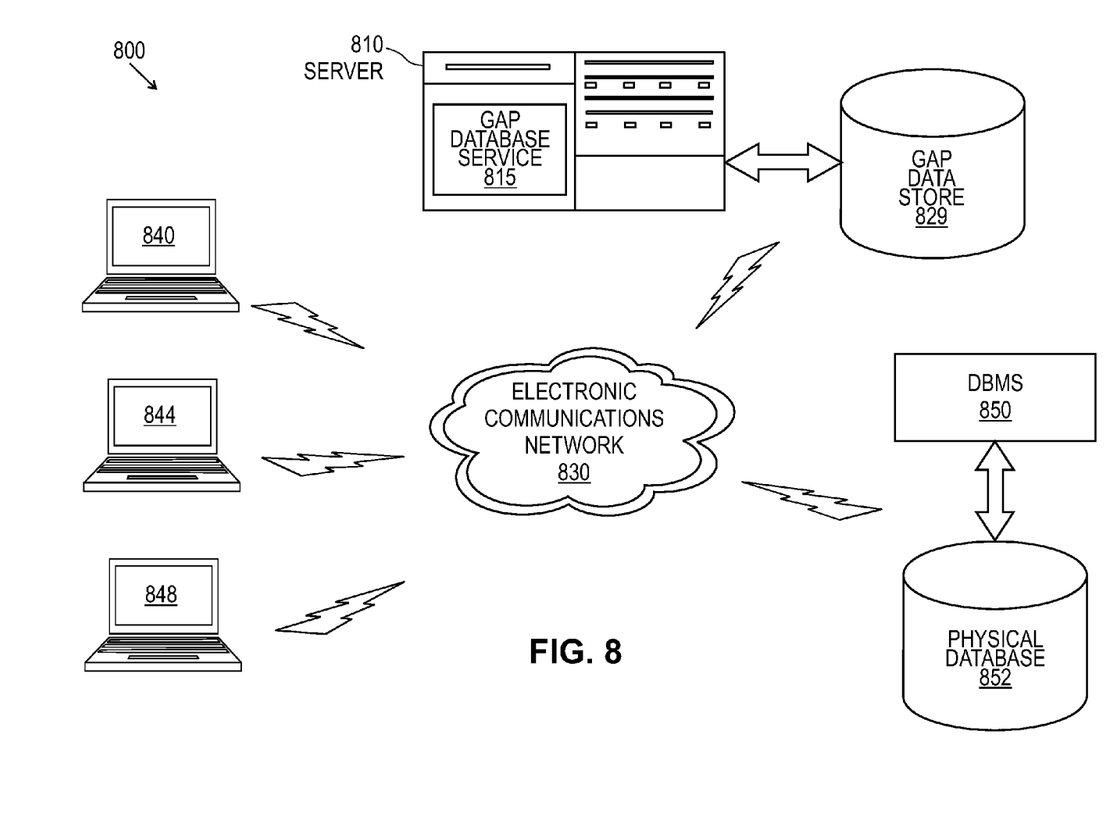
FIG. 8 depicts a system in accordance with an embodiment.

FIG. 8 depicts GAP system 800 in accordance with an embodiment. System 800 can include server 810 that supports GAP database service 815. Server 810 is in communication with GAP data store 820. Gap data store 820 can be one or more disparate physical memory systems for storing data. These physical memory systems may comprise a portion, an entirety, or several, of any type of non-volatile mass storage memory technology (e.g., hard disk drives, optical disc drives, magneto-optical disc drives, holographic memory, bubble memory, etc.). GAP data store 820 may include application container 110, 300; table container 120, 340; data set container 130, 370; and parameter table 140, 400; base template 505, parent and custom templates 510-545, 605-635; and user schema directory 740.

Communication between the server and the GAP data store can be either over electronic communication network 830, or a dedicated communication path. Electronic communication network 830 can be, can comprise or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding and/or any other suitable communication means. It should be recognized that techniques and systems disclosed herein are not limited by the nature of network 830.

Server 810 includes at least one control processor that is configured to support operation of GAP database service 815 by executing executable instructions accessible by the control processor. Dedicated hardware, software modules, and/or firmware can be used to implement GAP database service 815.

Connected to server 810 via electronic communication network 830 are one or more client computers 840, 846, 848. The client computers can be any type of computing device suitable for use by an end user in performance of the end user's tasks (e.g., a personal computer, a workstation, a thin client, a netbook, a notebook, tablet computer, etc.).

The client computers can communicate with database management system (DBMS) 850 over the electronic communication network and through the GAP system. The GAP system can then communicate with the DBMS to access data stored in physical database 852. DBMS 850 may comprise any system for managing a database instance that is or becomes known. The GAP system can receive requests for data from a database application being run by the client computer. The GAP system can process the request and translate into Structured Query Language (SQL) physical database commands to access/create/modify contents within database 852, and may return the requested data to the requesting client computer.

Figure 9:
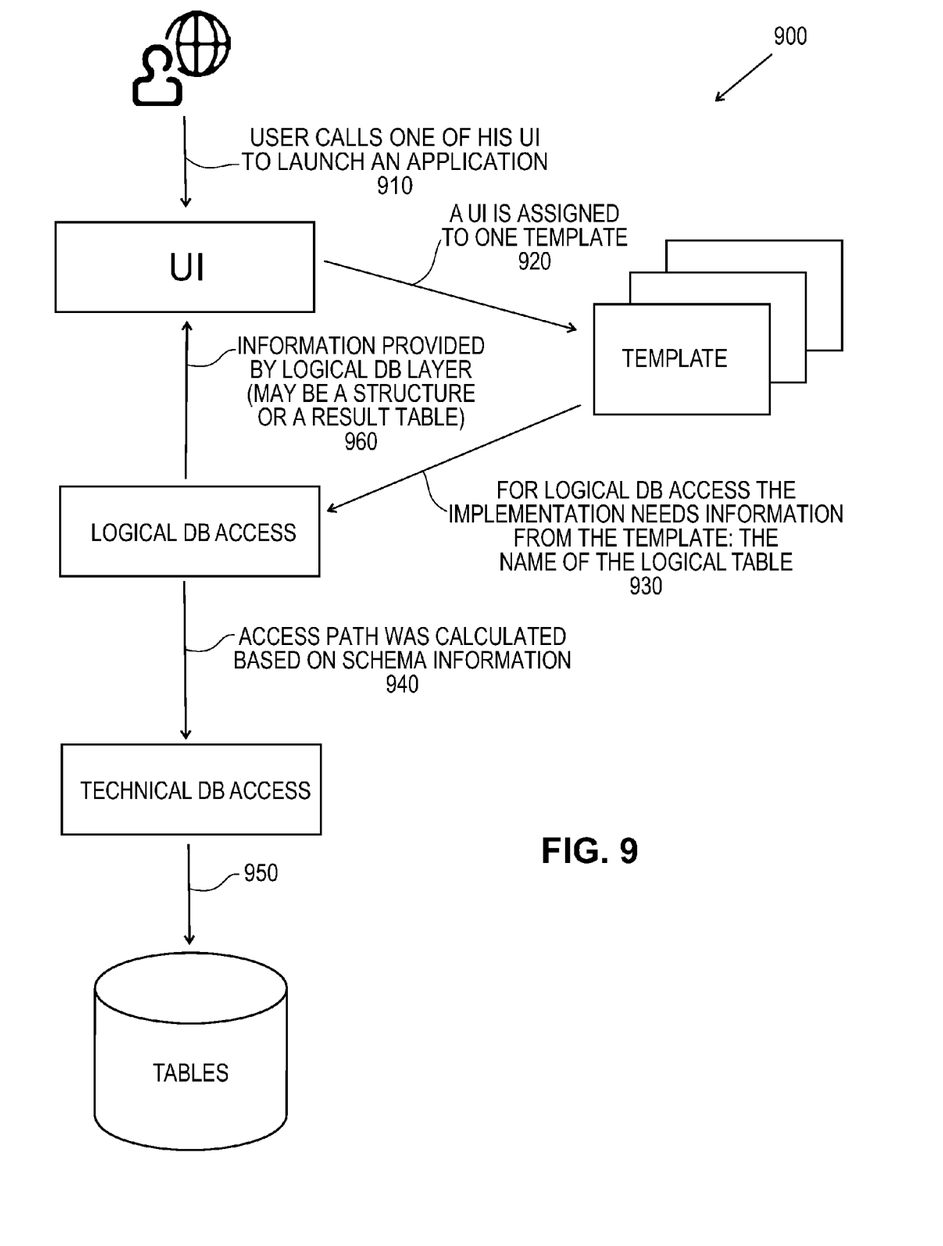
FIG. 9 depicts a process in accordance with another embodiment.

FIG. 9 depicts data retrieval process 900 for retrieving data in a GAP database system in accordance with an embodiment. At step 910, a user launches an application via calls from a UI. The UI is assigned, step 920, a template from the user schema directory based on the launched application. The template provides information, step 930, needed to access the GAP logical database including the name of the logical table. The GAP database system accesses a path, step 940, to the technical (physical) database based on the schema information of the template. The physical database (under operation by a DBMS) accesses, step 950, the data stored in tables of the database. The accessed data is provided, step 960, through the GAP database system to the UI. The information provided by the GAP layer may be a structure or a result table. A similar approach of using templates and the GAP database system can be implemented so that data provided by the user to the UI is written to the logical database.

Figure 10:
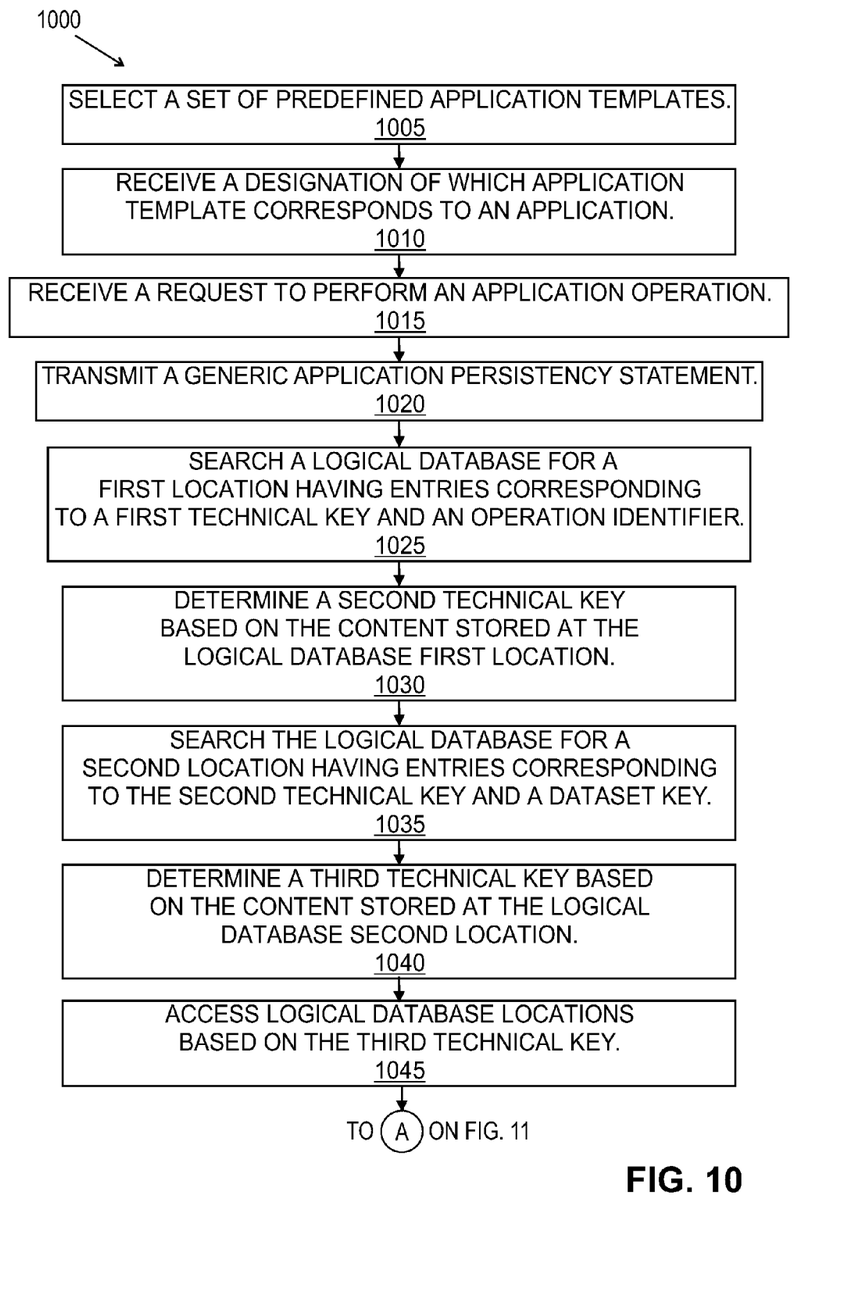
FIG. 10 depicts a process in accordance with an embodiment.

FIG. 10 depicts an embodying GAP data retrieval process 1000 using a GAP database service to access data. For example, a user of company ITelo wants to access the Purchase Order Header data having a key=1235 (POH table 200, FIG. 2). The user logs into a client computer. By doing so automatically all templates that have been defined for company ITelo can be used by applications triggered by the user. Process 1000 selects at step 1005 a set of predefined application templates from among the templates stored in a schema directory. For example with user logon, "Procurement Application" is selected with technical key 1. The GAP database service receives a designation, step 1010, of which application template corresponds to the application.

The user starts the application and requests the display of Purchase Order Header data with key=1235, step 1015. The UI references the template, for example PO_APPLICTION_TEMPLATE. That template will be used for processing session calls made by the user via the procurement application to the physical database connected to the DBMS.

The application transmits, step 1020, a generic persistency statement, for example, the SELECT statement: "SELECT*from PO_APPLICTION_TEMPLATE where key=1235"

The GAP database service searches, step 1025, in the logical database for a first location (e.g., table container 340 (FIG. 3) for the entry in the table corresponding to a first parent technical key (key=1 from user login above) and operation identifier='POH'. The GAP database service determines, step 1030, that the first location contents has an entry of second technical key=1.

At step 1035, the GAP database service searches the logical database for a second location, e.g., dataset container 370, having entries corresponding to second parent technical equal 1 (from step 1030) and dataset key equal 1235 (from the SELECT command). The contents corresponding to these two keys is determined, step 1040, to be a third technical key=4.

The GAP database service accesses, step 1045, the logical database locations of parameter table 400 (FIG. 4) to find all entries where third parent technical key=4. As a result of process 1000, a set of column data is returned to the application by the GAP database service—{Order number=1235, Supplier name=Computer Schulze, Creator=Kunze, Status=Delivered}. This data represents the contents of the physical database locations of POH table 200 having an order number of 1235.

Figure 11:
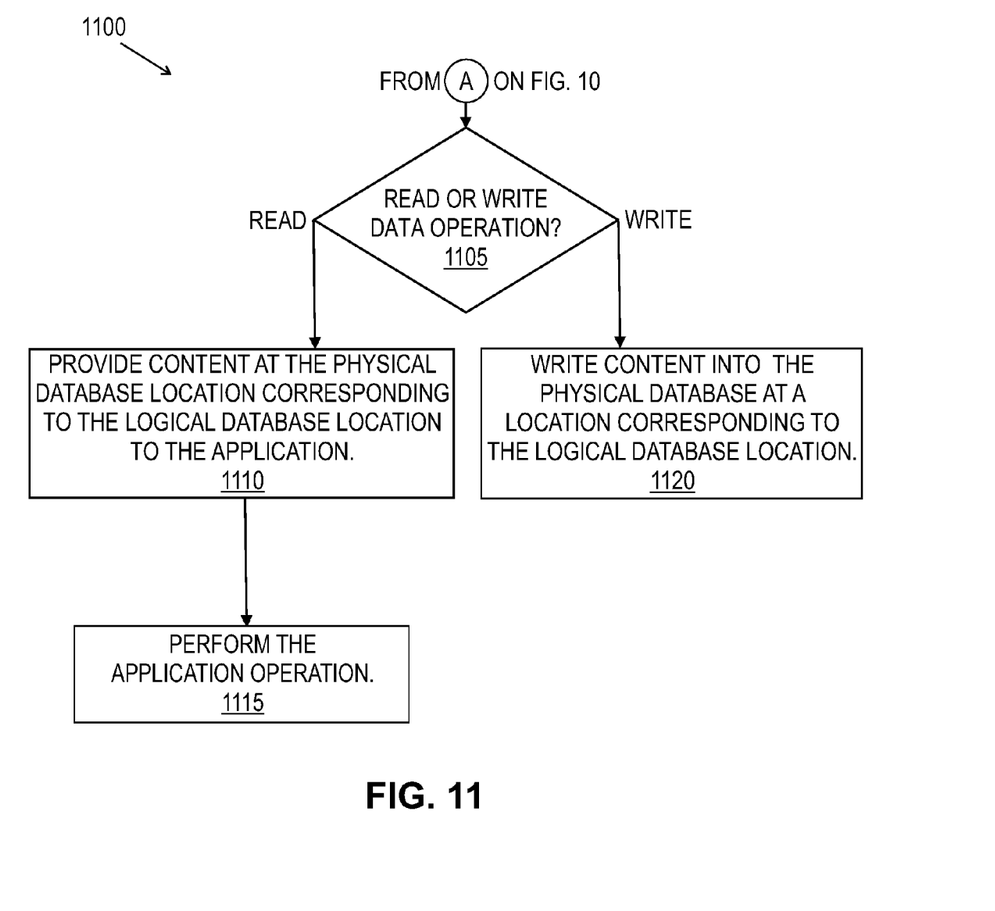
FIG. 11 depicts a portion of the process depicted in FIG. 10.

In some embodiments, process 1000 can continue as indicated by bubble A. FIG. 11 depicts process 1100, which can be a continuation of process 1000 for embodiments where the application includes read and/or write operations, step 1105, to the physical database. If the application is a read operation, process 1100 provides, step 1110, content to the physical database location corresponding to the logical database location. The application would then have access to the read data via the GAP database service template to perform the called operation, step 1115. If at step 1105 a write operation is determined, process 1100 can continue and write content, step 1120, into the physical database location corresponding to the logical database location.

It should be understood that not all operations could be handled generically. There may be some application specific code needed if applications do more than generic operations. For application operations that handle only data (e.g., showing data on a screen without processing the data), there is no need for specific code. But if there are some operations (e.g., adding amounts or calculating dates), application specific code might be needed. The organization of such code is similar to the organization of schema data described above.

Figure 12:
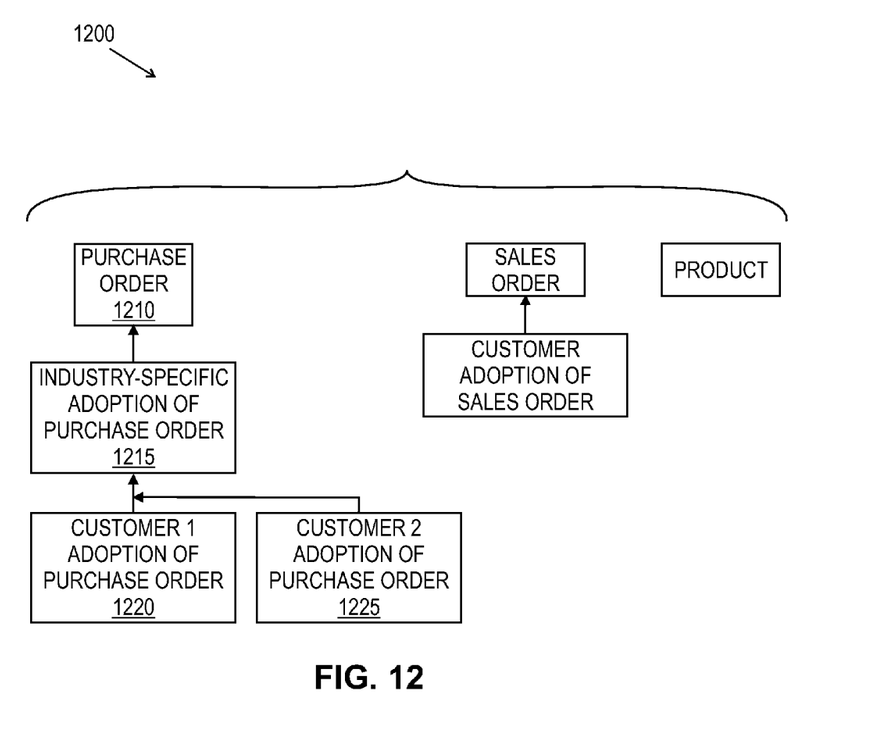
FIG. 12 depicts a code organization diagram in accordance with another embodiment.

FIG. 12 depicts code organization diagram 1200 for describing the dependency derivation of specific code. The derivation of an implementation can be determined in the same way as described above for the schema data. For example, purchase order application 1210 can have a derivation to an industry specific implementation—purchase order application 1215. This industry specific implementation can have a derivation that can contain custom specific code for multiple customers—customer 1 adoption/adaptation purchase order 1220, and customer 2 adoption/adaptation purchase order 1225. The custom specific code may be an object orientated derivation of a given implementation. At login or the first time in a session, a UI is provided an instance of the right class to processes the custom specific code. There can be more than one customer working at a system, therefore there may be different customer specific adoptions/adaptations.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for generic application persistency in accessing data stored in a physical database having a predefined database design in accordance with an embodiment.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with other embodiments. Thus, while there have been shown, described, and pointed out fundamental novel features as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for accessing a physical database implemented under a predefined physical data model, the method comprising:
receiving a request from a user interface to perform an operation of an application, the application associated with a first technical key, the application operation associated with an operation identifier, and the request including a dataset key;
transmitting a generic application persistency statement having a syntax defined in an application template belonging to a set of predefined application templates, the application template corresponding to the application;
searching a logical database for a first location having entries corresponding to the first technical key and the operation identifier;
determining a second technical key based on content stored at the first location;
searching the logical database for a second location having entries corresponding to at least one of the second technical key and the dataset key;
determining a third technical key based on content stored at the second location; and
accessing one or more locations of the logical database based on at least the third technical key, wherein the contents of the one or more logical database locations correspond to content of the physical database.

2. The method of claim 1, further including:
providing the contents of the physical database corresponding to the one or more locations of the logical database to the application; and
performing the application operation.

3. The method of claim 1, further including writing content into at least one location of the physical database corresponding to the one or more logical database locations.

4. The method of claim 1, further including selecting a set of predefined application templates, wherein members to the set are selected based on an identity.

5. The method of claim 4, wherein the identity for selection of members is at least one of a user identity and an organizational identity.

6. The method of claim 1, wherein the syntax includes parameters representing the first technical key, the application operation, and the dataset key.

7. The method of claim 1, further including receiving from the user interface the designation of which application template of the set of predefined application templates corresponds to the application.

8. A non-transitory computer readable medium having stored thereon instructions which when executed by a processor cause the processor to perform the method of:
receiving a request from a user interface to perform an operation of an application, the application associated with a first technical key, the application operation associated with an operation identifier, and the request including a dataset key;
transmitting a generic application persistency statement having a syntax defined in an application template belonging to a set of predefined application templates, the application template corresponding to the application;
searching a logical database for a first location having entries corresponding to the first technical key and the operation identifier;
determining a second technical key based on content stored at the first location;
searching the logical database for a second location having entries corresponding to the second technical key and the dataset key;
determining a third technical key based on content stored at the second location; and
accessing one or more locations of the logical database based on at least the third technical key, wherein the contents of the one or more logical database locations correspond to content of the physical database.

9. The computer readable medium of claim 8, further including executable instructions to cause a processor to perform the step of
providing the contents of the one or more locations of the logical database to the application; and
performing the application operation.

10. The computer readable medium of claim 8, further including executable instructions to cause a processor to perform the step of writing content into at least one location of the physical database corresponding to the one or more logical database locations.

11. The computer readable medium of claim 8, further including executable instructions to cause a processor to perform the step of selecting a set of predefined application templates, wherein members to the set are selected based on an identity.

12. The computer readable medium of claim 11, wherein the identity for selection of members is at least one of a user identity and an organizational identity.

13. The computer readable medium of claim 8, wherein the syntax includes parameters representing the first technical key, the application operation, and the dataset key.

14. The computer readable medium of claim 8, further including executable instructions to cause a processor to perform the step of receiving from the user interface the designation of which application template of the set of predefined application templates corresponds to the application.

15. A system comprising:
at least one server connected to an electronic network and having a control processor configured to support operation of a generic application persistence database service;
a logical database maintained in a data store in communication with the generic application persistence database service via the electronic network;

one or more client computers connected to the electronic network;

a database management system in communication with one or more of the client computers via the electronic network, the database management system (DBMS) in communication with a physical database;

at least one set of four physical database containers, wherein at least three of the four physical database containers include as content one or more technical keys; and the generic application persistence database service is configured to use the one or more technical keys as an index guide to access data in the DBMS physical database.

16. The system of claim 15, further including:

a user schema directory contained in the data store, the user schema directory including at least one of a template and code portion; and the generic application persistence database service is configured to associate at least one of the template and the code portion to a user to access data stored in the DBMS physical database.

17. The system of claim 15, wherein a logical representation of data within the four physical database containers is independent from a physical representation of the data within the DBMS physical database.

* * * * *